Nov. 4, 1958 P. H. ERDLE ET AL 2,859,088
PROCESS OF MAKING DENTAL PARTS
Filed Nov. 15, 1954 2 Sheets-Sheet 1

Paul H. Erdle
Roy C. Feagin
INVENTORS

BY
Richardson, David and Nordon
ATTORNEYS.

Nov. 4, 1958    P. H. ERDLE ET AL    2,859,088
PROCESS OF MAKING DENTAL PARTS

Filed Nov. 15, 1954    2 Sheets-Sheet 2

Paul H. Erdle
Roy C. Feagin
INVENTORS:

BY Richardson, David and Nordon
ATTORNEYS.

United States Patent Office 2,859,088
Patented Nov. 4, 1958

2,859,088

PROCESS OF MAKING DENTAL PARTS

Paul H. Erdle, Chicago, Ill., and Roy C. Feagin, Mountain Lakes, N. J., assignors to Austenal, Inc., a corporation of New York Application November 15, 1954, Serial No. 468,727

10 Claims. (Cl. 18—47)

The present invention relates to a novel process of making dental parts such as dentures, teeth, jacket crowns, inlays, demonstration models and the like, from synthetic organic resins. Generally, the invention relates to a novel process of molding polymerizable, organic compositions, and more specifically, to the casting of fluid, polymerizable organic compositions in flexible hydrocolloid molds. The term polymerizable compositions or polymerizable materials, as used herein, includes compounds and compositions capable of forming large-size molecules by polymerization of any type including straight addition without elimination of water, alcohol or similar by-products, condensation which may involve elimination of such by-products from polymer formed, and other polymerization reactions.

Heretofore in the formation of resinous dental parts, such as, for instance, dentures, a wax replica of the denture to be produced having, for instance, the teeth inserted therein, was superimposed on a dental model, i. e. a plaster model of the patient's gum, and a mold of plaster or dental stone was formed or invested about the waxed-up gum model or combined dental model. After setting of the mold material the wax was softened by heating, and then the gum model was removed and the wax was stripped off to leave a cavity conforming to the desired denture base, the teeth being held in position by the plaster with their necks projecting into the cavity. The cavity in the rigid mold was filled with the desired resin composition which was then caused to polymerize usually under heat and pressure.

The conventional manner of introducing the resin compositions into the mold involved kneading a powdered polymer and a liquid monomer to a dough-like consistency after which the material was placed in the mold. The mold was closed by re-insertion of the gum model and the closed mold was placed under pressure and heat to effect the desired polymerization.

Sometimes the mold was closed by re-insertion of the gum model after the removal of the wax and placed under pressure, and then the dough-like or rubbery polymerizable material was injected into the mold by pressure, usually with heating. Polymerization was then effected by heat curing in water at 160° F., frequently followed by a subsequent additional cure in boiling water for 30 minutes to 1 hour.

The injection of the dough-like resin compositions required considerable pressure to insure complete filling of the mold cavity by the mass and necessitated costly and complex special equipment. If the pressure was not properly applied, some of the teeth would shift and cause the relationship between the upper and lower dentures to be off. Occasionally the pressure cracked the teeth or even the dental model.

Notwithstanding the pressure applied in the molding and the polymerization of the material, a certain polymerization shrinkage was found to be unavoidable, and frequently caused undesirable inaccuracies of surfaces of the product which were supposed to correspond to surfaces of the patient's gum.

In order to permit removal of the product from the mold, the mold had to be completely destroyed and could not be re-used. Moreover, removal of the mold itself sometimes produced cracking of the teeth.

It is one object of the present invention to provide a novel process for molding organic resins in which polymerization shrinkage does not impair the accuracy of those surfaces of the product in which close conformity to a predetermined model is essential.

Another object of the invention is to provide a procedure for producing accurate dental parts from organic resins while eliminating all danger of damage to the product and to the mold.

A further object of the invention is to provide a novel process for preparing dental parts from organic resins employing fluid resin compositions which insure complete filling of the mold cavity without pressure.

Still another object of the invention is to provide a process for the molding of dental parts which permits ready re-use of the mold material either for the preparation of additional similar products or for the preparation of different molds.

Other objects and advantages will become apparent from the following detailed description of the invention with reference to the accompanying drawings, wherein.

In accordance with the present invention, it has been found that molds including at least a flexible mold portion composed of a hydrocolloid material in gel form can be used with great advantages for the production of dental parts from fluid solutions or slurries of polymerizable organic resin compositions which set at about room temperature without application of pressure.

Figure 1:
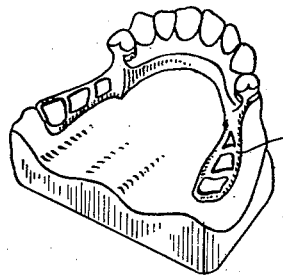
Fig. 1 is a perspective view of a dental model, which is a replica of the patient's gum, for which a partial denture is to be made with a precast metal skeleton for the denture being seated on the model.
Figure 2:
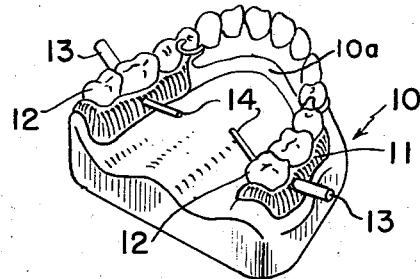
Fig. 2 is a perspective view of the dental model according to Fig. 1 including the metal skeleton, after waxing up and application of artificial teeth thereto, the resulting combined dental model constituting a replica of the patient's gum as it will appear after application of the partial denture.

Referring more particularly to the drawings, Fig. 1 shows a plaster or similarly rigid dental model 10 conforming to the patient's gum, having seated thereon a precast metal skeleton 10a for the partial denture to be prepared. To this replica 10, 10a, wax 11 is applied and artificial teeth 12 are set in the wax (Fig. 2), the wax body having projections 13 and 14 formed thereon.

Figure 3:
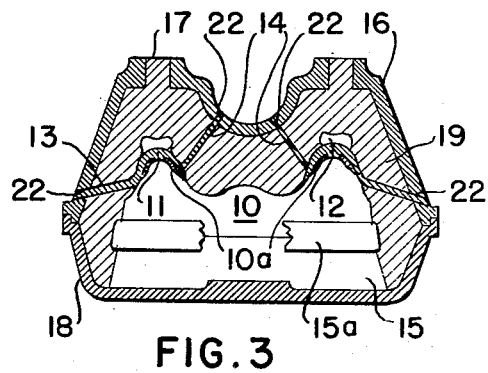
Fig. 3 is a longitudinal section of a two-part flask in which a hydrocolloid flexible mold has been formed about the combined dental model of Fig. 2.

The waxed-up dental model is then placed on a metal block 15 to which it is attached by a rubber band 15a and inserted in a molding flask conforming approximately on an enlarged scale to the dental model, the flask comprising an upper member 16 provided with pouring holes 17 and a lower member 18. Members 16 and 18 are joined and a hydrocolloid solution is poured into the flask through holes 17. The hydrocolloid is permitted to set or gel to form a flexible mold 19 (Fig. 3).

Figure 4:
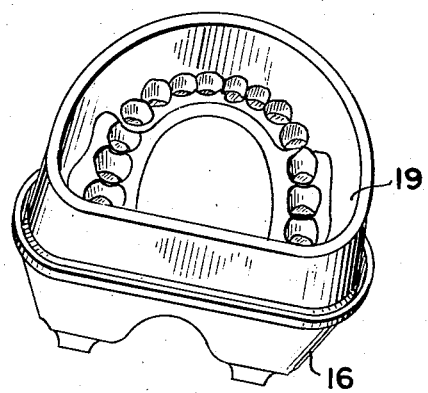
Fig. 4 is a perspective view of the upper portion of the flask of Fig. 3 and containing the flexible mold, the flask having been inverted and the dental model removed.

Following setting of the mold, the flask is inverted as shown in Fig. 4, and the lower member 18 is removed together with the combined dental model including the gum model 10, metal skeleton 10a, the wax 11 and the teeth 12. The combined dental model is heated and the wax 11 is stripped off. Then the teeth are replaced in the inverted mold after removal of the wax, and thereafter the stripped model 10 is also replaced in the mold to close it. In the case of a partial denture, the metal skeleton 10a is positioned on the model 10 as shown in Fig. 1. In contrast herewith, in conventional casting operations employing rigid molds, because of undercut portions the teeth could not be removed from the rigid mold and the flask had to be heated to melt out the wax and thereby free the teeth from the dental model.

Figure 5:
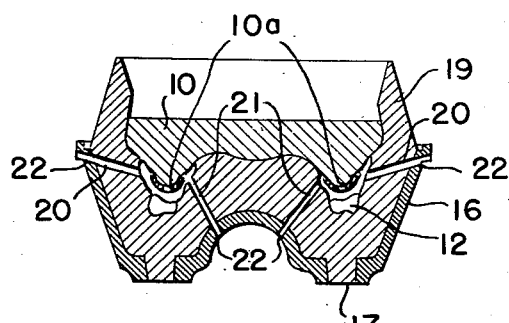
Fig. 5 is a longitudinal section of the flask and mold of Fig. 4 after removal of the wax from the dental model, re-insertion of the teeth in the flexible mold and replacement of the dental model of Fig. 1 including the metal skeleton.
Figure 6:
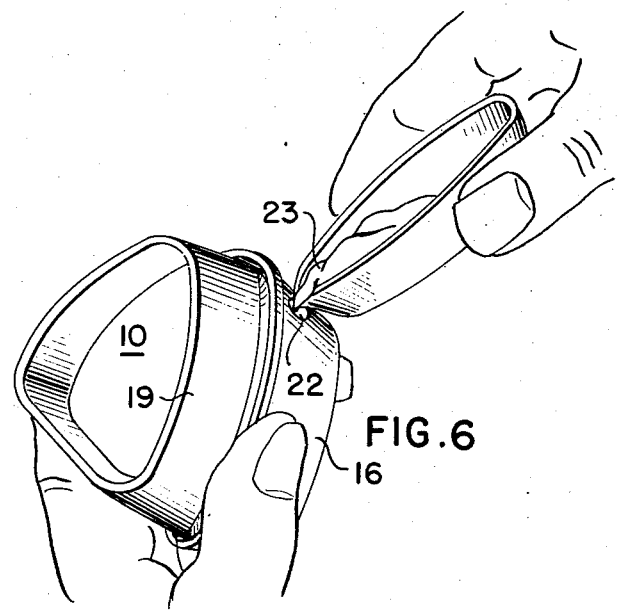
Fig. 6 is a perspective view showing filling of the mold cavity of Fig. 5 by pouring into the mold a fluid polymerizable organic composition.

As shown in Fig. 5, the flexible mold portion 19 is provided with pouring sprues 20 corresponding to wax portions 13 and with air vents 21 corresponding to wax portions 14. Apertures 22 may be drilled in the flask member 16 to provide communication with the sprues 20 and the air vents 21. The fluid, polymerizable, organic resin composition 23 is poured into the structure of Fig. 5 through apertures 22 as shown in Fig. 6, and the composition, which completely fills the cavity, is permitted to polymerize without application of pressure. Heating may be employed but the temperature should not be permitted to rise to the point where the mold begins to liquefy.

Alternatively, the product may be removed from the mold after it has set or hardened, even before polymerization is complete, and the polymerization may subsequently be completed by heat curing of the product for the desired length of time and at an elevated temperature.

The shrinkage normally accompanying polymerization in the usual rigid molds results in the introduction of internal stresses in the product. Upon breaking the mold to release the dental part formed, the latter is distorted due to these stresses so that it no longer fits the model. Similarly, these stresses may result in slight dislocation of the teeth. Consequently, the final specimen does not conform exactly on its inside surface with the patient's gum and will cause the patient considerable discomfort.

Figure 7:
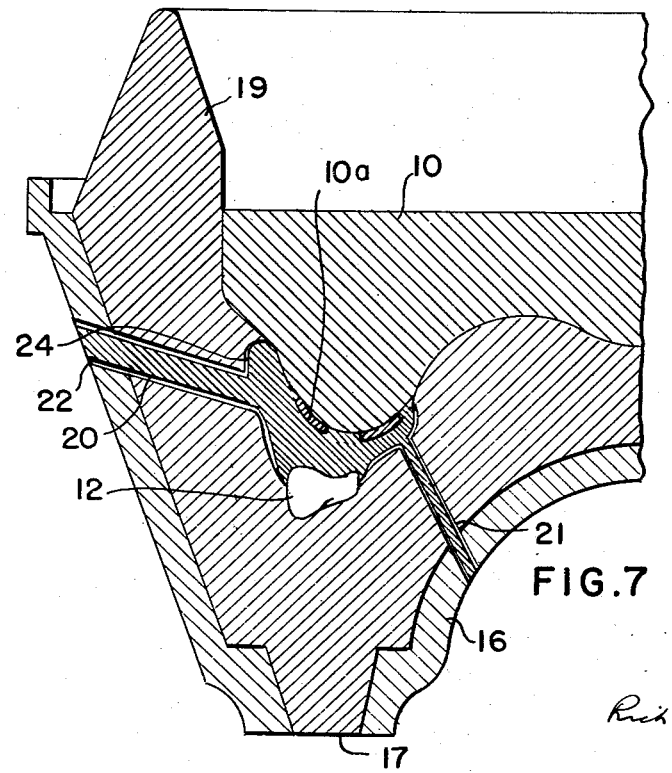
Fig. 7 is a longitudinal section of a portion of the closed mold on an enlarged scale after setting of the organic composition.

In contrast therewith, by effecting the polymerization in a cavity between a hydrocolloid mold and a plaster model these disadvantages are avoided. As shown in Fig. 7 on an exaggerated scale, the polymerized resin material 24 shrinks away from the hydrocolloid mold 19 while it does not shrink away from either the dental model 10 or the teeth 12. Consequently, no internal stresses are created and the dental part will not be subject to distortion upon removal from the mold. The shrinkage facilitates removal of the product from the mold which because of its flexibility may be resiliently displaced from the finished denture part without destruction of the mold or damage to the teeth.

Figure 8:
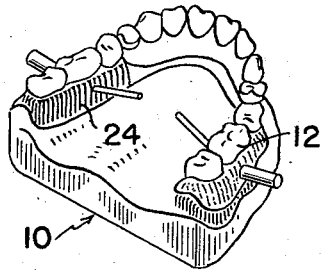
Fig. 8 is a perspective view of the dental model with the polymerized material and teeth thereon after removal of the flask and flexible mold.

The denture part 24 after removal from the mold has the appearance shown in Fig. 8 and is ready for use without polishing merely by cutting off the projections corresponding to sprues 20 and vents 21. The outer contour may differ slightly, although imperceptibly, from the structure of Fig. 2 because of shrinkage. However, the absence of internal stresses ensures that the teeth are not loosened in the denture base and that the casting will continue to fit the model, thereby guaranteeing comfort when applied over the patient's gum.

Figure 9:
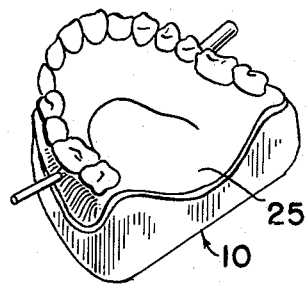
Fig. 9 is a perspective view of a different dental model showing the replica of a patient's gum with a full denture formed thereon.

Fig. 9 shows a casting 25 of a complete denture which may be formed in a similar manner, the resin portions corresponding to the wax portions of the combined dental model employed for forming the hydrocolloid mold.

The products obtained in accordance with the present invention have a glossy surface and, as noted, do not require polishing. If desired, however, the model may be coated in known manner with a foil or other coating agents to permit easy separation of the product from the model.

Any hydrocolloid capable of setting to a gel may be employed. Suitable hydrocolloids include agar agar, the alginates, gelatin, pectin, Irish moss, and the like. The hydrocolloid is dissolved or suspended in water in a concentration depending upon the ultimate gel strength desired, since the hardness of the molds may be varied. The gel strength should be at least 25 grams in order to avoid deformation of the mold during casting. When working with molds of moderate thickness, it is preferable that the gel strength be at least 300 grams and possibly as high as 500 grams to avoid deformation of the mold under its own weight. Greater gel strengths are permissible but the molds will be less flexible.

Gel strength, as referred to herein, may be determined in the following manner. The material to be tested is melted and poured into a flat Petri dish about 14 to 15 mm. inside depth and 51 mm. inside diameter. The material is allowed to gel and is then placed into a desiccator for 24 hours. The desiccator contains water to provide a saturated atmosphere. The gel strength test is made at a temperature of 25° C. The gel specimen is levelled to the level of the Petri dish by slicing with a knife. A spindle attached to a weighting mechanism is placed on the gel. The spindle has a square flat face ⅜" on each side. Metal shot is poured slowly and continuously into a container attached to the top of the spindle until the spindle touches the bottom of the dish in 15 seconds. The weight required is taken as the gel strength of the material.

A particular hydrocolloid solution suitable for preparation of a flexible mold having a gel strength of about 300 grams comprises a 6% agar agar solution made from about 10.5 pounds of agar agar dissolved in a mixture of 25 gallons of hot water and 10 gallons of glycerine. If the solution is to be stored for any length of time, it is desirable to add a preservative such as pyridyl mercuric acetate. Agar agar molds may be cut up into pieces and re-melted for use in the making of new molds.

Solutions of 0.5% to 10% of sodium alginate in water and having viscosities up to about 1000 centipoises may also be used to advantage in forming the hydrocolloid mold. The concentrations may be increased where harder gels are desired. To gelatinize the hydrocolloid, calcium salts such as calcium citrate may be employed to form a calcium alginate gel or, alternatively, acidic materials which will not deleteriously affect the resin may be employed to form alginic acid gels, e. g., gluconic acid delta lactone.

The mold surface may be coated prior to casting if it is desired to reduce the porosity or to prevent any interaction between the hydrocolloid mold and the resin casting. For this purpose a 10% solution of a vinyl chloride-vinyl acetate copolymer, identified commercially as Vinylite VYHH, dissolved in ethylene dichloride has proven satisfactory. However, most of the resins have been found to be inert to hydrocolloids under the preferred casting conditions of the process according to the invention.

As previously noted, the fluid resin compositions may be employed as solutions or slurries. Suitable solutions include alkyd resins, which may or may not contain ethylenic unsaturations, dissolved in an ethylenically unsaturated monomer such as styrene, methyl methacrylate, ethyl methacrylate, ethylene glycol dimethacrylate, vinyl toluene, divinyl benzene, triallyl cyanurate, or diallyl phthalate. The alkyd resins comprise linear condensation products of glycols such as ethylene or propylene glycol with the polybasic acids such as maleic, fumaric and itaconic, succinic, adipic, or similar acids.

Alternatively, other liquid resin compositions such as mixtures of epoxy resins with hardeners therefor may be employed as the solutions poured into the cavity of the flexible mold. The epoxy resins comprise condensation products of epichlorhydrin or similar polyfunctional epoxides with polyhydric phenols such as bis-phenol A (4,4 - dihydroxy-di-phenyl-dimethyl-methane), resorcinol, and the like, the condensation products being liquid and containing residual epoxy groups. These epoxy groups may be cross linked to form an infusible resin by various hardeners such as polycarboxylic acid anhydrides, polyamines, polyamides, and various other polyfunctional reagents. In forming the desired dental parts, the epoxy resins and hardeners therefor are combined and the mix is poured into the mold. Where epoxy resins are used, it is preferred to line the flexible mold for instance with a polyvinyl coating which may be less than 1/1000 of an inch thick.

The successful use of a slurry of polymethyl methacrylate in methyl methacrylate is particularly suprising since under normal casting conditions this composition is sensitive to water and satisfactory castings cannot be obtained in the presence of water. It would therefore have been expected that this composition could not be used with hydrocolloid gels containing a preponderant amount of water. This is found true where elevated temperatures are involved. At room temperatures, however, this composition is no longer water sensitive and surprisingly can be cast in the hydrocolloid molds without difficulty.

As an aid in effecting the polymerization or setting of the products, various accelerators, activators and catalysts may be employed, either as solids or dissolved in the monomer or even the polymer. Suitable catalysts for this purpose include organic peroxides such as benzoyl peroxide or ethyl methyl ketone peroxide. These catalysts may be activated by various materials such as dimethyl-p-toluidine, m-tolyl diethanolamine, and cobalt and manganese salts such as the octoate and naphthenate. The speed of the polymerization may be regulated by the amount of catalyst and accelerator added.

In addition, various inert fillers or pigments may be added to the resin compositions for altering the physical properties thereof. Whitening pigments such as titanium dioxide are particularly useful as are orange or pink pigments for approximating the color of the gums. Similarly, silica, cellulose floc, asbestos and glass beads or fibers may be incorporated, if desired, to decrease the amount of powder necessary in the slurry castings.

The following examples indicate fluid formulations which are suitable for forming castings in the hydrocolloid molds hereinbefore described:

Formulation I

| | Grams |
|---|---|
| (a) Ethylene glycol maleate polyester dissolved in about 30% b. w. of styrene | 100 |
| Dimethyl-p-toluidine | .125 |
| Benzoyl peroxide | 1.0 |

This composition gels in 5 minutes and is hard in 15 minutes.

(b) Reducing the dimethyl-p-toluidine to .063 gm. serves to increase the gel time to one-half hour and the hardening time to one hour.

(c) Reducing the dimethyl-p-toluidine to .032 gm. increases the gel time to about one hour although this time will vary with the thickness of the section.

Formulation II

| | Grams |
|---|---|
| (a) Ethylene glycol maleate polyester dissolved in about 30% b. w. of styrene | 100 |
| 60% solution of ethyl methyl ketone peroxide | 2 |
| Cobalt octoate (6% cobalt) | .25 |

In about an hour the formulation gels and is hard in two hours.

(b) Increasing the cobalt octoate to .5 gm. reduces the gel time to about 17 minutes.

(c) The gel time is decreased to five minutes when the cobalt octoate is further increased to 1.0 gm.

(d) An overnight cure is required when the cobalt octoate content is decreased to .125 gm.

Formulation III

By replacing the cobalt octoate of Formulations IIa, b, c and d with an equal weight of cobalt naphthenate substantially equal gel and hardening times are obtained.

Formulations II and III can be pigmented by incorporating therewith 0.10 gm. of titanium dioxide and 0.04 gm. of a cadmium red pigment.

Formulation IV

In place of the cobalt octoate of Formulation II manganese octoate containing 6% of manganese is employed in amounts ranging from .5 to 2.5 gms. The gelation time varies from 45 to 75 minutes, inversely to the concentration of manganese.

Formulation IV can be pigmented by incorporating therewith 0.10 gm. of titanium dioxide and 0.04 gm. of a cadmium red pigment.

Formulation V

| | Grams |
|---|---|
| Ethylene glycol maleate polyester dissolved in about 30% b. w. of styrene | 100 |
| p-Toluene sulfinic acid | 1 |
| Benzoyl peroxide | 1 |

This composition gives a water-clear cured specimen overnight at room temperature.

Formulation VI

| | | |
|---|---|---|
| Polymethyl methacrylate (denture grade) | gm | 60 |
| Methyl methacrylate | cc | 30 |
| Dimethyl-p-toluidine | cc | .53 |

The use of denture grade polymethyl methacrylate obviates the need for a separate catalyst. The composition cures at room temperature in about one-half hour.

Formulation VII

| | | |
|---|---|---|
| Polymethyl methacrylate (denture grade) | gm | 60 |
| Methyl methacrylate | cc | 30 |
| Dimethyl-p-toluidine | cc | .23 |
| Benzoyl peroxide | gm | .6 |

The benzoyl peroxide may be ground with the powdered resin, the amine dissolved in the liquid, and the powder and liquid mixed. Alternatively, the amine can be dissolved in one portion of the liquid and the peroxide in the remainder and then both liquid portions and the powder mixed.

Formulation VIII

| | | |
|---|---|---|
| (a) Styrene-acrylonitrile copolymer | gm | 60 |
| Methyl methacrylate | cc | 30 |
| Dimethyl-p-toluidine | cc | .23 |
| Benzoyl peroxide | gm | 3 |

The peroxide is mixed with the polymer and the amine with the monomer, the powder formed into a slurry with the liquid, and the slurry poured into the mold cavity.

(b) In the above formulation the powder may comprise a polystyrene bead polymer. Alternatively, only a portion of the powder may be replaced by the polystyrene with substantially identical results.

(c) The powder may be replaced by a mixture of methyl methacrylate bead polymer and one-third its weight of a polyvinyl chloride-acetate copolymer containing chloride equivalent of 95% vinyl chloride in the copolymer.

In all of Formulations V–VIII the liquid monomer may comprise styrene with substantially similar results. In similar manner the catalysts and accelerators may be interchanged. Non-swelling fillers may be substituted for anywhere up to one-fourth of the powder.

*Formulation IX*

100 parts by weight of a liquid epoxy resin, consisting of a condensation product of bis-phenol-A with epichlorhydrin, and having a viscosity between 500 and 1500 centipoises, are mixed with about 10 to 12 parts by weight of a liquid polyamine such as diethylenetriamine. The mixture can be poured into a preferably lined hydrocolloid mold and sets at room temperature within two hours.

Various other changes and modifications may be made without departing from the spirit and scope of the present invention. Thus, it will be understood that the projections corresponding to the desired sprues and vents may be omitted from the wax portion of the combined dental model and the sprues and vents may be formed by drilling into the flexible mold through holes preformed in the metal flask or drilled in the latter for this purpose. Similarly, in some cases, and particularly where the polymerizable materials used display little polymerization shrinkage, it may be desirable to use instead of a plastic dental model a hydrocolloid model. It is intended that such obvious changes and modifications be embraced by the annexed claims.

What we claim is:

1. The process which comprises forming a mold including at least one flexible mold portion composed of gelled agar material which becomes fluid upon heating, casting in said mold a fluid polymerizable organic material effectively inert to said agar material and which polymerizes at a temperature below that at which said agar material becomes fluid, and polymerizing said organic material at a temperature below the fluidizing temperature of said agar material.

2. The process according to claim 1, wherein said fluid polymerizable organic material comprises a solution of an alkyd resin in a liquid monomer containing an ethylenic unsaturation and copolymerizable therewith at room temperature.

3. The process according to claim 1, wherein said fluid polymerizable organic material comprises a slurry of a polymeric material in a liquid monomer containing an ethylenic unsaturation.

4. The process, according to claim 1, wherein the fluid polymerizable organic material comprises a number selected from the group consisting of styrene, methyl methacrylate, ethyl methacrylate, ethylene glycol dimethacrylate, vinyl toluene, divinyl benzene, triallyl cyanurate and diallyl phthalate.

5. The process of preparing a denture which comprises forming a combined dental model, which includes a rigid gum model, a model of the denture base, and the artificial teeth which will form a part of the completed denture, surrounding said combined dental model with a heated aqueous agar solution which sets to a gel upon cooling, cooling the agar solution to thereby form a gelled flexible mold, withdrawing said combined dental model from said mold, reinserting the aforesaid artificial teeth in their respective cavities in the flexible mold, inserting a gum model without the denture base model into the mold, thereby closing the mold, forming pouring and venting apertures in said mold communicating with the space defined by the omission of the denture base model, pouring into said space a fluid polymerizable organic material which polymerizes at a temperature below that at which said flexible mold material becomes fluid, polymerizing said polymerizable material at a temperature below the fluidizing temperature of said mold material, and separating the gum model and the completed denture from the mold.

6. The process according to claim 5, wherein polymerization of the polymerizable material is partially completed in the mold and finally completed by heating after separation of the formed denture from the mold.

7. The process according to claim 5, wherein said fluid polymerizable organic material comprises a solution of an alkyd resin dissolved in a member selected from the group consisting of styrene, methyl methacrylate, ethyl methacrylate, ethylene glycol dimethacrylate, vinyl toluene, divinyl benzene, triallyl cyanurate, and diallyl phthalate, said solution further containing a polymerization accelerator.

8. The process according to claim 5, wherein said fluid polymerizable organic material comprises a slurry of a polymeric material selected from the group consisting of polymethyl methacrylate, polystyrene, vinyl chloride-acetate copolymer and styrene acrylonitrile copolymer, in a liquid monomeric methyl methacrylate, said slurry further containing a polymerization accelerator.

9. The process, according to claim 5, wherein said fluid polymerizable organic material comprises a slurry of a polymeric material selected from the group consisting of polymethyl methacrylate, polystyrene, vinyl chloride-acetate copolymer and styrene-acrylonitrile copolymer, in liquid monomeric styrene, said slurry further containing a polymerization accelerator.

10. The process, according to claim 5, wherein the mold is lined with a coating of a vinyl chloride-vinyl acetate copolymer and then filled with a fluid expoxy resin as the fluid polymerizable material.

References Cited in the file of this patent
UNITED STATES PATENTS

| | | |
|---|---|---|
| 2,234,993 | Vernon et al. | Mar. 18, 1941 |
| 2,271,454 | Erdle et al. | Jan. 27, 1942 |
| 2,599,573 | Milton et al. | June 10, 1952 |